United States Patent [19]

Bakker

[11] Patent Number: 4,705,467
[45] Date of Patent: Nov. 10, 1987

[54] METHOD AND APPARATUS FOR FILTERING THE AIR OUTLET OF A SOLID SULPHUR PARTICLE PRODUCTION APPARATUS

[75] Inventor: Johannes Bakker, Calgary, Canada

[73] Assignee: Shell Oil Company, Houston, Tex.

[21] Appl. No.: 799,681

[22] Filed: Nov. 19, 1985

[30] Foreign Application Priority Data

Nov. 28, 1984 [CA] Canada ................................... 468768

[51] Int. Cl.$^4$ ................................................ B29B 9/00
[52] U.S. Cl. ........................................... 425/7; 55/299; 55/300; 55/520; 55/524; 55/484
[58] Field of Search ...................... 425/7; 55/299, 300, 55/520, 524, 484

[56] References Cited

U.S. PATENT DOCUMENTS

| | | | |
|---|---|---|---|
| 954,451 | 4/1910 | Merrell | 425/7 |
| 1,035,822 | 8/1912 | Green | 55/484 |
| 1,202,953 | 10/1916 | Adams | 55/484 |
| 1,356,780 | 10/1920 | Nicol | 425/7 |
| 1,370,376 | 1/1983 | Gangal et al. | 55/524 |
| 1,443,134 | 1/1923 | Klug | 55/520 |
| 1,930,357 | 10/1933 | Heather | 55/520 |
| 2,858,561 | 11/1958 | Kuppersmith | 55/300 |
| 3,447,289 | 6/1969 | Pegg | 55/300 |
| 3,577,705 | 5/1971 | Sharlit | 55/300 |
| 3,819,310 | 6/1974 | Mavroic | 425/7 |
| 3,830,631 | 8/1974 | Young et al. | 425/7 |

FOREIGN PATENT DOCUMENTS

| | | | |
|---|---|---|---|
| 547553 | 10/1957 | Canada | 425/7 |
| 379967 | 11/1922 | Fed. Rep. of Germany | 55/520 |
| 656099 | 1/1934 | Fed. Rep. of Germany | 55/520 |
| 1204011 | 1/1960 | France | 55/520 |
| 1108669 | 6/1961 | France | 425/7 |
| 594618 | 11/1947 | United Kingdom | 55/520 |
| 839694 | 6/1981 | U.S.S.R. | 425/7 |

*Primary Examiner*—Tim Miles

[57] ABSTRACT

The invention relates to a filter screen for the air outlet of an apparatus used to produce solid sulphur particles from a stream of molten sulphur supplied to the apparatus. According to the invention the filter screen comprises a plurality of closely spaced resiliently deformable filter elements arranged across the air outlet. The advantage of this arrangement is that sulphur particles collected on the resiliently deformable filter elements can be easily removed by causing the filter elements to vibrate. The filter elements may take the form of coil springs arranged adjacent one another about the air outlet. Also disclosed is a method for producing sulphur particles in which sulphur coating a filter screen is periodically dislodged by vibrating resilient deformable filter elements.

6 Claims, 2 Drawing Figures

METHOD AND APPARATUS FOR FILTERING THE AIR OUTLET OF A SOLID SULPHUR PARTICLE PRODUCTION APPARATUS

BACKGROUND OF THE INVENTION

The invention relates to apparatus for producing solid sulphur particles of molten sulphur supplied to the apparatus.

Apparatus of this kind is well-known and generally used for the production of solid sulphur particles or beads.

DESCRIPTION OF THE PRIOR ART

An example of such known apparatus comprises a hollow column, sulphur spray means in the upper part of the column, sulphur supply means connected to the sulphur spray means, an air inlet in the lower part of the column, air supply means connected to the air inlet, a collecting device in the lower part of the column for collecting the solid sulphur particles produced, discharge means for removing the solid sulphur particles produced from the column and an air outlet in the upper part of the column.

In this known apparatus molten sulphur is injected into the column through the sulphur spray means and air is passed from the air inlet to the air outlet of the column. The sulphur injected into the column is cooled by the air passing through the column and condenses in such a manner that solid sulphur particles or beads are formed. The solid sulphur particles or beads fall to the collecting device wherein they are collected. From the collecting device the solid sulphur particles or beads, which are the desired product, are discharged from the column.

In the column, a small part of the liquid and/or solid sulphur is entrained in the stream of air passing from the air inlet to the air outlet. In order to minimize emission problems it is desirable to provide the air outlet with a suitable filter. However, conventional filters have the disadvantage that any sulphur collected on the filter elements is difficult to remove and furthermore often represent a significant obstruction to free air flow out of the air outlet, which is required for proper operation.

SUMMARY OF THE INVENTION

In order to solve or alleviate this problem in a simple and inexpensive manner the invention provides a filter screen for the air outlet of an apparatus for producing solid sulphur particles, which filter screen comprises a plurality of closely spaced resiliently deformable filter elements arranged across the air outlet.

The resilient filter elements must be spaced in such a manner that they present a significant open area to the air flow out of the air outlet. The degree of obstruction to air flow caused by the resilient filter elements can be readily determined by persons skilled in the art. Surprisingly, it is found that such an array of the resilient filter elements is nevertheless effective at removing significant quantities of sulphur fines. Clearly, however, if the array of resilient filter elements is too open, the effectiveness of the filter screen will be reduced. The resilient filter elements may for example be elongate elements mounted adjacent one another in close spacing and having ends supported on the periphery of the air outlet. Such resilient filter elements may have a partially open cross-section in the plane of the air outlet. It has furthermore been found that the sulphur, normally difficult to remove from surfaces in the apparatus, can be displaced by deforming the resilient filter elements so that the surface bond is broken.

In a suitable embodiment of the invention the resiliently deformable filter elements are coil springs.

Preferably the coil springs are in at least partly extended condition; for example, the springs are extended to from 2.5 to 3 times their unextended condition.

Not only do the springs effectively collect a significant part of the sulphur fines, but also the sulphur collected on the springs can be simply removed from the springs by causing the springs to vibrate.

These and other features, objects, and advantages of the present invention will become apparent from the following detailed description, wherein reference is made to the Figures in the accompanying drawings.

BRIEF DESCRIPTION OF THE DRAWING

FIG. I shows a vertical cross-section of the apparatus;

FIG. II shows a horizontal cross-section H—H of the upper part of the apparatus according to Figure I, but on a scale which is larger than the scale of Figure I.

DESCRIPTION OF THE PREFERRED EMBODIMENT

Figure 1:
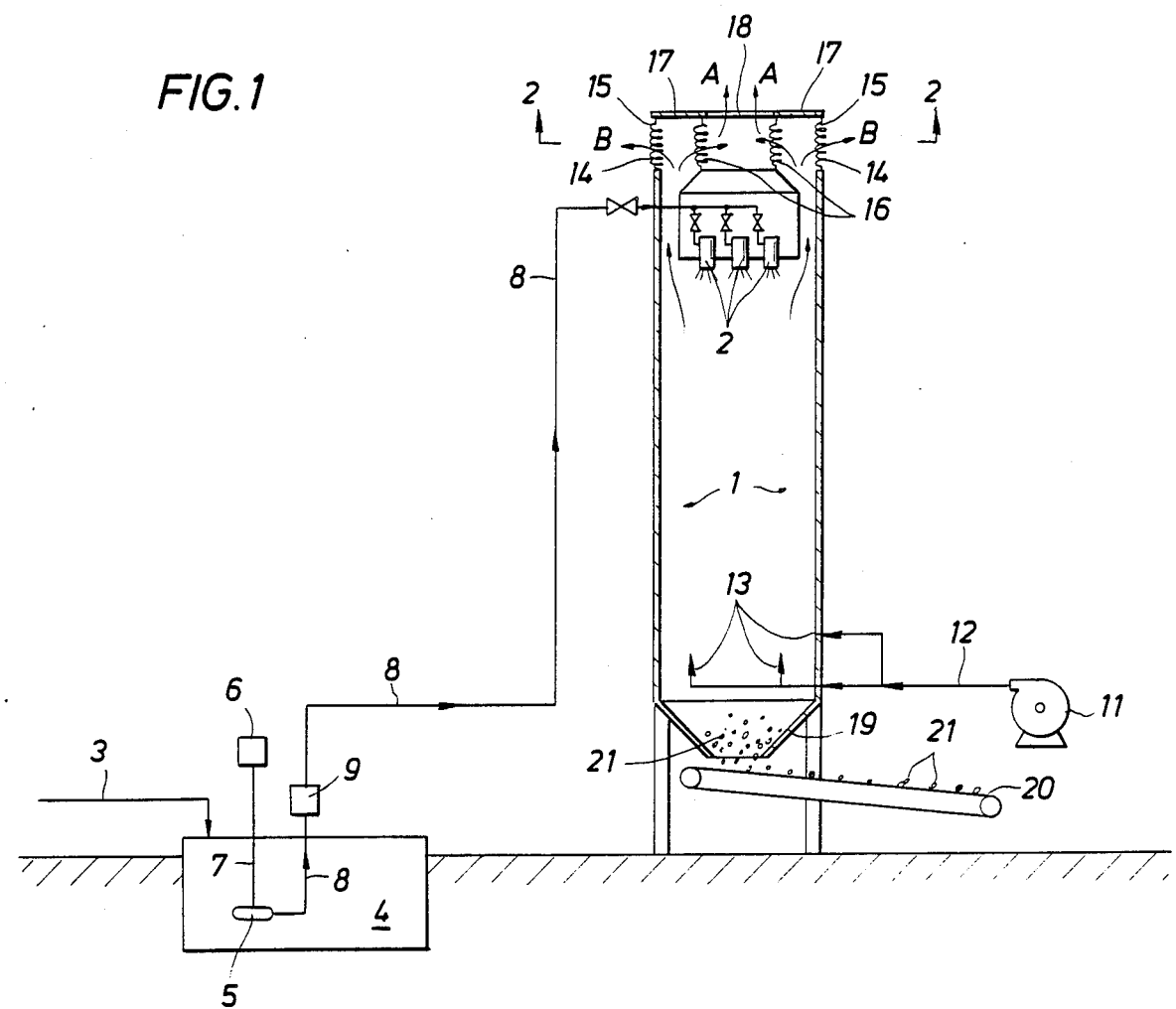

The apparatus as shown in the drawings comprises a column 1 in the shape of a hollow cylinder. In the upper part of the column 1 sulphur spray means 2 are present, for example a plurality of jacketed sulphur spray pods 2, which may be heated by means of steam during normal operation.

A sulphur reservoir 4 is provided with a sulphur supply conduit 3 for the supply of molten sulphur to the reservoir 4. In the reservoir 4 a sulphur pump 5 is present, which is connected to a drive motor 6, for example, an electric motor, by means of a drive shaft 7.

The pressure side of the pump 5 is connected to the sulphur spray means 2 by means of a sulphur supply conduit 8. The supply conduit 8 is preferably provided with a jacket, so that the contents of the conduit 8 may be heated by means of steam during normal operation. A sulphur filter 9 may be arranged in the conduit 8, if desired.

A plurality of air inlets 13 is arranged in the lower part of the column 1. These air inlets 13 are connected to an air blower 11 by means of an air supply conduit 12.

Furthermore, the lower part of the column 1 is provided with a collecting device 19 for collecting the solid sulphur particles or beads 21 produced in the column 1. Below the collecting device 19, a suitable conveyor 20 is present for transporting the sulphur particles 21 from the collecting device 19 to a suitable destination.

The top of the column 1 is provided with an end wall 17 and the upper part of the column 1 is provided with one or more air outlets. In the embodiment shown there is an outer air outlet 14 and an inner air outlet 18.

Figure 2:
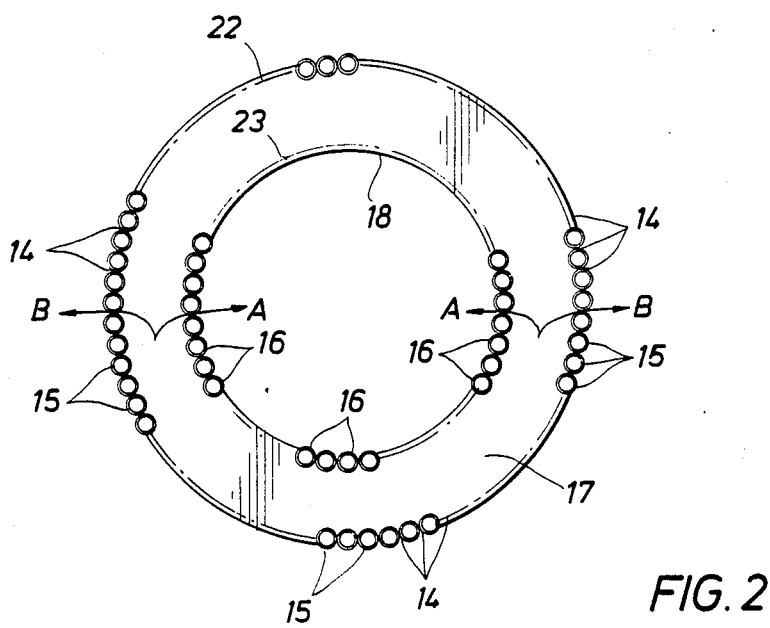

Across the outer air outlet 14, a plurality of coil springs 15 are arranged adjacent to one another and along an imaginary cylinder 22, (shown in FIG. 2) in such a manner that said springs 15 form a closely spaced filter screen across the air outlet 14. In the same way, across the inner air outlet 18, a plurality of coil springs 16 are arranged adjacent to one another and along an imaginary cylinder 23, in such a manner that said springs 16 form a closely spaced filter screen across the air outlet 18. The springs 15 and 16 are preferably in extended condition; they are for example extended to from 2.5 to 3 times their unextended length.

During normal operation of the apparatus described in the above, molten sulphur is pumped by pump 5 from the reservoir 4 and through the conduit 8 to the sulphur spray means 2. The liquid sulphur is injected into the upper part of the column 1 by the spray means 2. At the same time the air blower 11 supplies air through conduit 12 to the air inlets 13, so that air is injected into the lower part of the column 1 by means of the air inlets 13. The air injected into the column 1 passes from the air inlets 13 upwards through the column 1 and leaves the column 1 via the air outlets 14 and 18, as shown respectively by the arrows B and A.

The molten sulphur injected into the column 1 through the spray means 2 is cooled by the air passing through the column 1 and condenses in such a manner that solid sulphur particles or beads 21 are formed. The solid sulphur particles or beads 21 fall to the collecting device 19, wherein they are collected. The solid sulphur particles or beads 21 are passed from the collecting device 19 to the conveyor 20 which transports the solid sulphur particles 21, which are the desired product, to a suitable destination.

In the column 1, a small part of the liquid and/or solid sulphur is entrained in the stream of air passing from the air inlets 13 to the air outlets 14 and 18. In order to minimize emission problems, it is desirable to provide the air outlets 14 and 18 with filter elements.

Suitable filter elements according to the invention are the coil springs 15 and 16 which are arranged across the air outlets 14 and 18 respectively. Sulphur 1 carried in the air passing through the outlets 14 and 18 adheres to the springs 15 respectively 16 by electrostatic attraction, or settling and sticking.

The sulphur 21 collected on the springs 15 and 16 is removed by periodically causing said springs 15 and 16 to vibrate thereby dislodging the sulphur 21 collected on the springs 15 and 16. For example, it is possible to hit one spring 15 causing it to vibrate, whereafter said spring 15 transmits the vibration to adjacent springs 15, so that the sulphur 21 will be removed from these adjacent springs 15 as well. Consequently, by hitting only a few springs 15, it is possible to cause all the springs 15, 16 to vibrate, so that the sulphur 21 will be removed from all the springs 15 and 16. The sulphur particles 21 dislodged from the springs 15 and 16 may fall back into the column 1 and be collected together with the sulphur beads 21 in the collecting device 19.

Different kinds of coil springs 15 and 16 may be used for the above purpose.

For example, 15 mm mean diameter coil springs 15 and 16 may be made of 1.5 mm diameter steel wire, helically wound and extended to from 2.5 to 3 times their unextended length. The springs 15 and 16 may be so arranged that they are spaced apart from each other, for example, with a clearance of about 1 mm. Alternatively, they may be so arranged in the extended condition that they are in permanent contact with each other. The springs may be provided with a suitable coating, for example, a tetrafluoroethylene coating.

In the embodiment of the apparatus as described two air outlets are present. Instead it is possible to provide the apparatus with a single air outlet or more than two air outlets.

In the embodiment of the apparatus as described the resiliently deformable filter elements are coil springs. It is however, also possible to use instead springs each having the form of a zig-zag strip.

Many other variations and mofifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A production apparatus for producing solid sulphur particles from molten sulphur supplied to the production apparatus, said production apparatus comprising:

a hollow column;
sulphur spray means in the upper part of the column;
sulphur supply means connected to the sulphur spray means;
an air inlet in the lower part of the column;
air supply means connected to the air inlet;
a collecting device in the lower part of the column for collecting the solid sulphur particles so produced;
discharge means for removing the solid sulphur particles produced from the column;
an air outlet in the upperpart of the column; and
a filter screen apparatus covering said air outlet, said filter screen apparatus comprising:
   a plurality of closely spaced resiliently deformable filter elements comprising coil springs mounted in vibration communication with one another and arranged across the air outlet in a manner effective to collectively releasably receive and hold sulphur carried in the air passing through the air outlet of the production apparatus; and
   vibrating means for resiliently deforming the filter elements in a manner effective to dislodge and release sulphur held thereon.

2. The production apparatus as claimed in claim 1, wherein the resiliently deformable filter elements are provided with a tetrafluoroethylene coating.

3. The production apparatus as claimed in claim 1, wherein the resiliently deformable filter elements of the filter screen apparatus are in extended condition.

4. The production apparatus as claimed in claim 3, wherein the coil springs are extended to from 2.5 to 3 times their unextended length.

5. A method for producing solid sulphur particles from molten sulphur supplied to the production apparatus, said method comprising the following steps:

injecting molten sulphur downwardly as a spray from the upper interior of a hollow column;
injecting air upwardly from the lower portion of the hollow column to cool the downwardly injected sulphur, thereby condensing the molten sulphur to solid sulphur particles;
collecting the solid sulphur particles in the lowermost portion of the hollow column;
filtering air expelled from the uppermost portion of the hollow column through a filter screen apparatus having a plurality of closely spaced resiliently deformable filter elements comprising coil springs mounted in vibration communication with one another and effective to remove and releasably hold liquid and/or solid sulphur entrained in the upwardly flowing air; and periodically vibrating the resilient deformable filter elements, deforming the filter elements to dislodge sulphur particles coated thereon.

6. A method for producing solid sulphur in accordance with claim 5 in which periodic vibration of the resilient deformable filter elements further comprises:
   striking only a few of the resiliently deformable filter elements; and
   transmitting vibration from one resiliently deformable filter element to adjacent filter elements.

* * * * *